United States Patent
Kusumoto

(10) Patent No.: US 7,181,394 B2
(45) Date of Patent: Feb. 20, 2007

(54) DEVICE SETTER, DEVICE SETTING SYSTEM, AND RECORDED MEDIUM WHERE DEVICE SETTING PROGRAM RECORDED

(75) Inventor: Noritaka Kusumoto, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 993 days.

(21) Appl. No.: 09/926,113

(22) PCT Filed: Dec. 25, 2000

(86) PCT No.: PCT/JP00/09213

§ 371 (c)(1),
(2), (4) Date: Sep. 4, 2001

(87) PCT Pub. No.: WO01/50454

PCT Pub. Date: Jul. 12, 2001

(65) Prior Publication Data

US 2002/0161572 A1    Oct. 31, 2002

(30) Foreign Application Priority Data

Jan. 5, 2000    (JP) .............................. 2000-000443

(51) Int. Cl.
*G10L 17/00*    (2006.01)
(52) U.S. Cl. ...................... 704/246; 704/275; 704/251; 704/9; 704/257
(58) Field of Classification Search ................ 704/231, 704/251, 270–276, 255, 256, 9, 257, 246; 379/88.14, 88.02, 88.03, 88.04, 88.01; 709/206; 381/181, 219, 229, 115

See application file for complete search history.

(56) References Cited

U.S. PATENT DOCUMENTS

| | | | | |
|---|---|---|---|---|
| 5,086,385 A | * | 2/1992 | Launey et al. | 700/83 |
| 5,774,841 A | * | 6/1998 | Salazar et al. | 704/225 |
| 6,513,006 B2 | * | 1/2003 | Howard et al. | 704/257 |
| 6,532,446 B1 | * | 3/2003 | King | 704/270.1 |
| 6,584,439 B1 | * | 6/2003 | Geilhufe et al. | 704/270 |
| 6,633,846 B1 | * | 10/2003 | Bennett et al. | 704/257 |
| 6,654,721 B2 | * | 11/2003 | Handelman | 704/270 |

FOREIGN PATENT DOCUMENTS

| | | |
|---|---|---|
| EP | 0 867 857 A2 | 9/1998 |
| JP | 2-171098 | 7/1990 |
| JP | 6-54440 | 7/1994 |
| JP | 6-233359 | 8/1994 |
| JP | 7-135689 | 5/1995 |

(Continued)

*Primary Examiner*—Vijay Chawan
(74) *Attorney, Agent, or Firm*—Armstrong, Kratz, Quintos, Hanson & Brooks, LLP.

(57) ABSTRACT

A word-device setting information storage part stores multiple device setting information in association with a single voice and a voice recognition part recognizes a voice input through a voice input part so that the multiple device setting information associated with the recognized voice is read from the word-device setting information storage part to a device control part, which in turn sets an internal device state of a device setting apparatus while an external device control part sets a state of an external device in response to the read multiple device setting information.

19 Claims, 11 Drawing Sheets

FOREIGN PATENT DOCUMENTS

| | | |
|---|---|---|
| JP | 08-139797 | 5/1996 |
| JP | 8-163660 | 6/1996 |
| JP | 2614552 | 2/1997 |
| JP | 10-23560 | 1/1998 |
| WO | WO 94/03020 | 2/1994 |

* cited by examiner

FIG. 6

| WORDS | DEVICE CONTROL 1 (DEVICE STATE 1) | DEVICE CONTROL 2 (DEVICE STATE 2) | DEVICE CONTROL 3 (DEVICE STATE 3) | DEVICE CONTROL 4 (DEVICE STATE 4) | DEVICE CONTROL 5 (DEVICE STATE 5) | ... |
|---|---|---|---|---|---|---|
| びでおさいせい | INPUT SWITCHING (VIDEO 1) | GRAPHIC MENU (DYNAMIC) | VOICE MENU (DYNAMIC) | SCREEN MODE (NORMAL) | EXTERNAL DEVICE (VCR) (REPLAY) | |
| でぃーぶいでぃーさいせい | INPUT SWITCHING (VIDEO 2) | GRAPHIC MENU (CINEMA) | VOICE MENU (CINEMA) | SCREEN MODE (SELF-WIDE) | EXTERNAL DEVICE (DVD) (REPLAY) | |
| げーむ | INPUT SWITCHING (VIDEO 4) | VOICE MENU (GAME) | SCREEN MODE (FULL) | VOLUME (15) | | |
| てれびおん | POWER SOURCE (POWER ON) | CHANNEL SWITCHING (8ch) | VOLUME (19) | | | |
| てれびおやすみ | VOLUME (10) | OFF-TIMER (30 MINUTES) | | | | |
| ... | | | | | | |

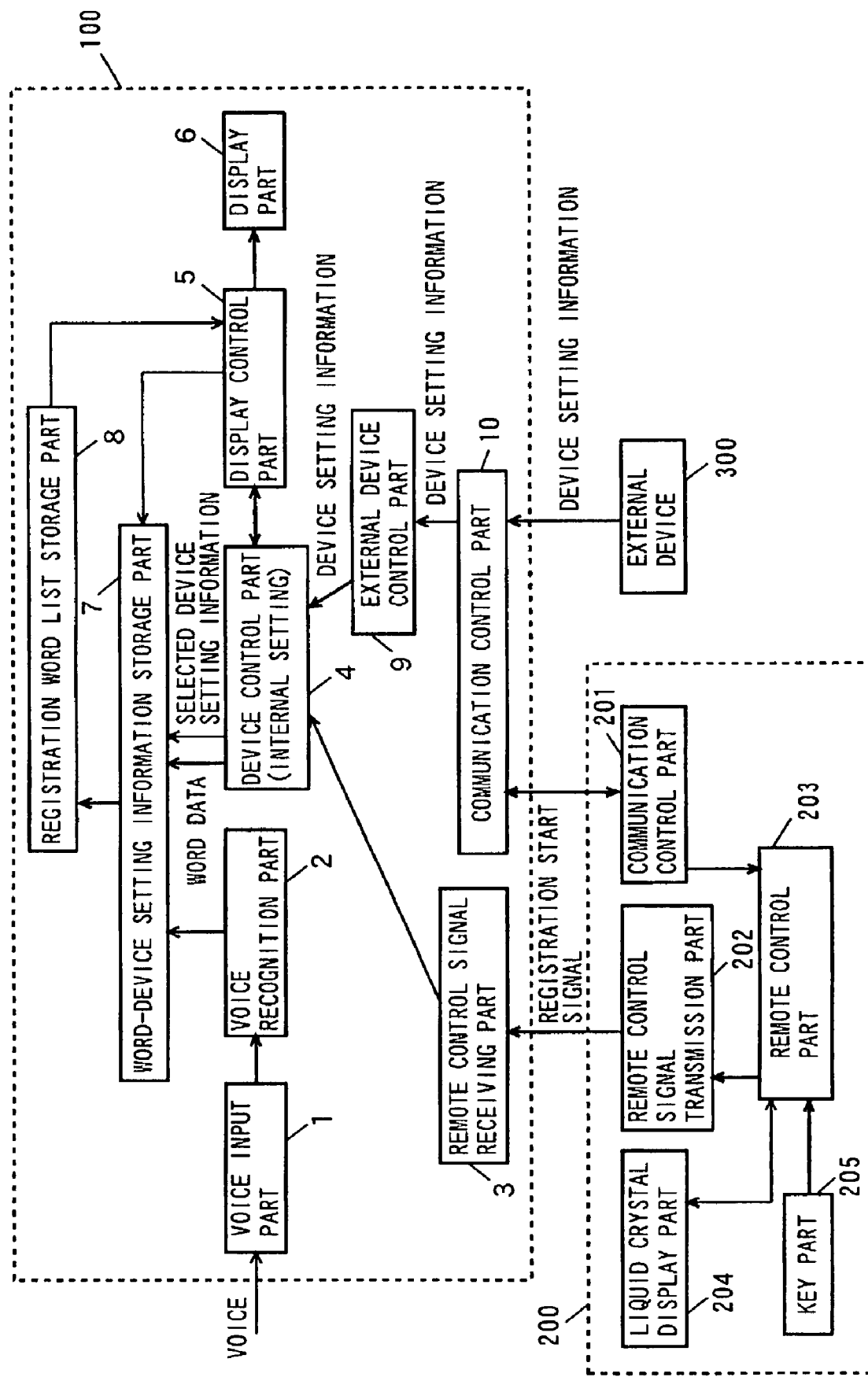
F I G. 8

FIG. 9

| あ | か | さ | た | な | は | ま | や | ら | わ | ん | が | ざ | だ | ば | ぱ |
|---|---|---|---|---|---|---|---|---|---|---|---|---|---|---|---|
| い | き | し | ち | に | ひ | み | や |  り |  |  | ぎ | じ | ぢ | び | ぴ |
| う | く | す | つ | ぬ | ふ | む | ゆ | る | ゆ |  | ぐ | ず | づ | ぶ | ぷ |
| え | け | せ | て | ね | へ | め | ゆ | れ |  |  | げ | ぜ | で | べ | ぺ |
| お | こ | そ | と | の | ほ | も | よ | ろ | を |  | ご | ぞ | ど | ぼ | ぽ |

| CHECK ITEM TO BE ACTIVE | CONTROLLED ITEM | DEVICE STATE |
|---|---|---|
|  | POWER SOURCE | ON |
|  | VOLUME | 13 |
| ✓ | CHANNEL (INPUT) | VIDEO1 |
| ✓ | GRAPHIC MENU | DYNAMIC |
| ✓ | VOICE MENU | DYNAMIC |
| ✓ | SCREEN MODE | NORMAL |
|  | OFF-TIMER | OFF |
|  | SURROUND | OFF |
| ✓ | EXTERNAL DEVICE (VCR) | REPLAY |

FIG. 12

| WORD (PRONUNCIATION) |
| --- |
| テレビ （てれび） |
| ビデオ （びでお） |
| ＤＶＤ （でぃーぶいでぃー） |
| ゲーム （げーむ） |
| デジタルＣＳ （でじたるしーえす） |
| レーザーディスク （れーざーでぃすく） |
| ・・・ |
| 再生 （さいせい） |
| 見る （みる） |
| プレイ （ぷれい） |
| ・・・ |
| オン （おん） |
| つけて （つけて） |
| つける （つける） |
| ・・・ |
| オフ （おふ） |
| 消して （けして） |
| 消す （けす） |
| ・・・ |

DEVICE SETTER, DEVICE SETTING SYSTEM, AND RECORDED MEDIUM WHERE DEVICE SETTING PROGRAM RECORDED

TECHNICAL FIELD

The present invention relates to a device setting apparatus for setting a device to a prescribed state, a device setting system and a recording medium recording a device setting program.

BACKGROUND ART

For example, Japanese Patent Laying-Open No. 6-233359 (1994) discloses a control unit as a conventional device setting apparatus. This control unit is applied to a remote control device for letting the operator input a voice identical to that having a pattern previously stored in an internal memory thereby outputting a control command with respect to the input voice to a controlled device without operating any key of the remote control device and remote-controlling the controlled device with the voice.

However, the aforementioned control unit can execute only a single control command with respect to a single voice. In order to set the controlled device to a target device state, therefore, the operator must repeatedly raise his voice for setting various states of the controlled device one by one. Further, a recent electronic device such as a television receiver is so multi-functional that set states of the device are extremely complicated, and hence extremely complicated operations are required for setting the device, leading to deterioration of operability in particular.

DISCLOSURE OF THE INVENTION

An object of the present invention is to provide a device setting apparatus capable of setting a device to a desired state with single vocalization and improving operability for device setting, a device setting system and a recording medium recording a device setting program.

A device setting apparatus according to an aspect of the present invention comprises voice input means converting an input voice to a voice signal, voice recognition means recognizing a voice corresponding to the voice signal converted by the voice input means, storage means storing multiple device setting information associated with a single voice and setting means reading multiple device setting information corresponding to the voice recognized by the voice recognition means from the storage means and performing multiple device setting in response to the read multiple device setting information.

The device setting apparatus converts an input voice to a voice signal, recognizes a voice corresponding to this voice signal, reads multiple device setting information for the recognized voice from the storage means and performs multiple device setting in response to the read multiple device setting information. When the operator raises a single voice, therefore, the device setting apparatus reads multiple device setting information corresponding to this voice and simultaneously executes corresponding multiple device setting. Consequently, the device setting apparatus can set a device to a desired state with single vocalization and improve operability for device setting.

The setting means preferably includes internal device setting means performing multiple device setting in the device setting apparatus.

In this case, multiple device setting in the device setting apparatus itself can be simultaneously performed with single vocalization, for improving operability for device setting in the device setting apparatus.

The device setting apparatus may be connected with an external device in a bidirectionally communicable state, and the setting means may include external device setting means performing multiple device setting on the external device.

In this case, the device setting apparatus connected with the external device in a bidirectionally communicable state can set the state of the external device. Therefore, the device setting apparatus can simultaneously perform multiple device setting of the external device with single vocalization, for improving operability for setting the external device.

The device setting apparatus preferably further comprises registration means registering multiple device setting information associated with a new voice in the storage means.

In this case, the device setting apparatus can newly register multiple device setting information associated with a new voice in the storage means, whereby a desired device state can be set with a desired voice of the operator, for further improving the operability.

The registration means preferably further includes display means displaying a plurality of words corresponding to a registrable voice and selection means for selecting a word corresponding to a voice to be registered from the plurality of words displayed on the display means, and the registration means preferably registers the word selected by the selection means in the storage means in association with multiple device setting information.

In this case, the device setting apparatus displays a plurality of words corresponding to a registrable voice and registers a word selected from the displayed plurality of words and multiple device setting information associated with this word in the storage means. Therefore, a word and multiple device setting information corresponding to a desired device state can be registered through a simple operation of selecting a desired word from the displayed plurality of words.

The registration means may further include character display means displaying a plurality of characters for forming a plurality of words corresponding to a registrable voice and selection means for selecting a character forming a word corresponding to a voice to be registered from the plurality of characters displayed on the character display means, and the registration means may register the word formed by the character selected by the selection means in the storage means in association the multiple device setting information.

In this case, the device setting apparatus displays a plurality of characters and registers a word selected from the displayed plurality of characters and multiple device setting information associated with this word in the storage means. Therefore, the operator can register an arbitrary word easy to use for him along with multiple device setting information, whereby the operability can be further improved.

The registration means may further include acquisition means acquiring multiple device setting information and selection means for selecting multiple device setting information associated with a new voice from the multiple device setting information acquired by the acquisition means, and the registration means may register the multiple device setting information selected by the selection means in the storage means in association with the new voice.

In this case, the acquisition means acquires multiple device setting information so that the operator selects desired device setting information from the acquired multiple device setting information and registers the selected multiple device setting information in the storage means. Therefore, multiple device setting information corresponding to a desired device state can be registered through a simple operation of selecting desired device setting information from the acquired multiple device setting information.

The selection means preferably further includes receiving means receiving a remote control signal transmitted to the device setting apparatus, and the selection means preferably performs selection in response to the remote control signal received by the receiving means.

In this case, the device setting apparatus can be so remote-controlled that the operator can register a desired voice also when at a distance from the device setting apparatus, and the operability of the device setting apparatus can be further improved.

A device setting system according to another aspect of the present invention comprises a device setting apparatus and a set device connected with the device setting apparatus in a bidirectionally communicable state, while the device setting apparatus includes voice input means converting an input voice to a voice signal, voice recognition means recognizing a voice corresponding to the voice signal converted by the voice input means, storage means storing multiple device setting information associated with a single voice and setting means reading multiple device setting information corresponding to the voice recognized by the voice recognition means from the storage means and performing multiple device setting of the set device in response to the read multiple device setting information.

The device setting system converts an input voice to a voice signal, recognizes a voice corresponding to this voice signal, reads multiple device setting information corresponding to the recognized voice from the storage means and performs multiple device setting in response to the read multiple device setting information. When the operator raises a single voice, therefore, the device setting system reads multiple device setting information corresponding to this voice and simultaneously executes corresponding multiple device setting. Consequently, the device setting system can set each device forming the system to a desired state with single vocalization and improve operability for device setting in the device setting system.

The set device preferably includes a remote control device for remote-controlling the device setting apparatus, connected with the device setting apparatus in a bidirectionally communicable state.

In this case, the device setting apparatus can be remote-controlled with the remote control device, whereby the operator can readily set each device forming the system including the remote control device to a desired state also when at a distance from the device setting apparatus, for further improving the operability for device setting in the device setting system.

A recording medium recording a device setting program according to still another aspect of the present invention records a device setting program for making a processing unit perform device setting in a device setting apparatus having the processing unit, voice input means converting an input voice to a voice signal and storage means storing multiple device setting information associated with a single voice, while the device setting program causes the processing unit perform steps of recognizing a voice corresponding to the voice signal converted by the voice input means, and reading multiple device setting information corresponding to the recognized voice from the storage means and performing multiple device setting in response to the read multiple device setting information.

The recording medium recording the device setting program makes the processing unit execute the device setting program thereby recognizing a voice corresponding to a voice signal converted from an input voice, reading multiple device setting information corresponding to the recognized voice from the storage means and performing multiple device setting in response to the read multiple device setting information. When the operator raises a single voice, therefore, the corresponding multiple device setting is simultaneously executed with the multiple device setting information corresponding to this voice. Consequently, a device can be set to a desired state with single vocalization, and operability for device setting can be improved.

The setting step preferably includes a step of performing multiple device setting in the device setting apparatus.

In this case, multiple device setting in the device setting apparatus itself can be simultaneously performed with single vocalization, for improving operability for device setting in the device setting apparatus.

The setting step may include a step of performing multiple device setting on an external device connected with the device setting apparatus in a bidirectionally communicable state.

In this case, the device setting apparatus connected with the external device in a bidirectionally communicable state can set the external device. Therefore, multiple device setting of the external device can be simultaneously performed with single vocalization, for improving operability for setting the external device.

The device setting program preferably further cause the processing unit perform steps of displaying a plurality of words corresponding to a registrable voice and registering a word selected from the displayed plurality of words in the storage means as a new voice in association with multiple device setting information.

In this case, a plurality of words corresponding to a registrable voice are displayed and a word selected from the displayed plurality of words and multiple device setting information associated with this word are registered in the storage means. Therefore, a word and multiple device setting information corresponding to a desired device state can be registered through a simple operation of selecting a desired word from the plurality of displayed words.

The device setting program may further cause the processing unit perform steps processing of displaying a plurality of characters for forming a plurality of words corresponding to a registrable voice and registering a word formed by a character selected from the displayed plurality of characters in the storage means as a new voice in association with multiple device setting information.

In this case, a plurality of characters are displayed and a word selected from the displayed plurality of characters and multiple device setting information associated with this word are registered in the storage means. Therefore, the operator can register an arbitrary word easy to use for him along with multiple device setting information, whereby the operability can be further improved.

The registering step preferably includes steps of acquiring multiple device setting information and registering multiple device setting information selected from the acquired multiple device setting information in the storage means in association with the new voice.

In this case, multiple device setting information is acquired so that the operator selects desired device setting information from the acquired multiple device setting information and registers the selected multiple device setting information in the storage means. Therefore, multiple device setting information corresponding to a desired device state can be registered through a simple operation of selecting desired device setting information from the acquired multiple device setting information.

BRIEF DESCRIPTION OF DRAWINGS

FIG. 6 illustrates examples of words and device setting information stored in a word-device setting information storage part shown in FIG. 1;

FIG. 8 is a block diagram for illustrating operations of the device setting system according to the flow chart shown in FIG. 7;

FIG. 9 illustrates an exemplary software keyboard employed for the word and set state registration shown in FIG. 7;

FIG. 12 illustrates an exemplary registration word list employed for the word and set state registration shown in FIG. 7.

BEST MODE FOR CARRYING OUT THE INVENTION

Figure 1:
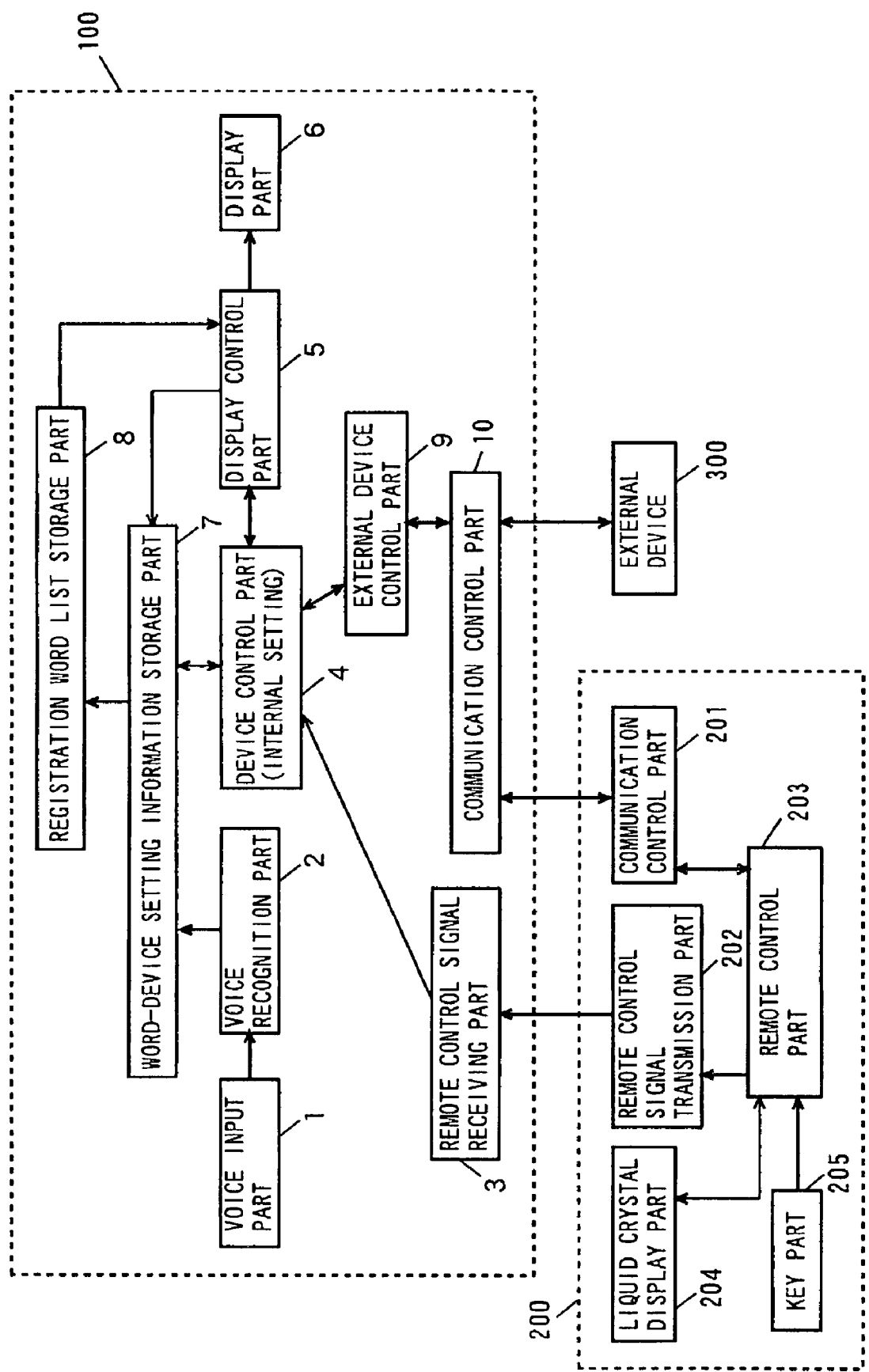
FIG. 1 is a block diagram showing the structure of a device setting system according to an embodiment of the present invention.

A device setting system according to an embodiment of the present invention is now described with reference to the drawings. FIG. 1 is a block diagram showing the structure of the device setting system according to the embodiment of the present invention.

The device setting system shown in FIG. 1 comprises a device setting apparatus 100, a remote control device 200 and an external device 300. The device setting apparatus 100 includes a voice input part 1, a voice recognition part 2, a remote control signal receiving part 3, a device control part 4, a display control part 5, a display part 6, a word-device setting information storage part 7, a registration word list storage part 8, an external device control part 9 and a communication control part 10. The remote control device 200 includes a communication control part 201, a remote control signal transmission part 202, a remote control part 203, a liquid crystal display part 204 and a key part 205.

The device setting apparatus 100 such as a television receiver, for example, is remote-controlled in response to a remote control signal output from the remote control device 200 for performing internal device setting as well as device setting of the remote control device 200 and the external device 300 connected therewith in a bidirectionally communicable state.

The remote control device 200 transmits the remote control signal to the device setting apparatus 100 by infrared communication, for example, thereby remote-controlling the device setting apparatus 100. The remote control device 200 transmits device setting information indicating the internal device setting state to the device setting apparatus 100 and performs internal device setting in response to device setting information transmitted from the device setting apparatus 100.

The external device 300 such as a video cassette recorder, a video disk drive or a game machine, for example, transmits the device setting information expressing the internal device setting state to the device setting apparatus 100 and performs internal device setting in response to the device setting information transmitted from the device setting apparatus 100.

The method of communication between the device setting apparatus 100 and the remote control device 200 as well as the external device 300 is not particularly restricted so far as the allows bidirectional communication, and IEEE 1394 (Institute of Electrical and Electronics Engineers 1394), RS-232C (Recommended Standard 232C), IrDA (Infrared Data Association) or the like is employable, for example. While the device setting apparatus 100 is connected with the single external device 300, the same may alternatively be connected with a plurality of external devices in a bidirectionally communicable state for setting states of the plurality of external devices.

The voice input part 1, formed by a microphone or the like, for example, converts a voice raised by the operator to a voice signal and outputs the voice signal to the voice recognition part 2. The voice recognition part 2 recognizes the voice raised by the operator with the voice signal output from the voice input part 1 and outputs word data corresponding to the recognized voice to the word-device setting information storage part 7. The voice input part 1 may alternatively be provided on the remote control device 200 for outputting a voice signal from the remote control device 200 to the voice recognition part 2 of the device setting apparatus 100. In this case, entire device setting can be performed by operating the remote control device 200.

The word-device setting information storage part 7 previously stores a plurality words and multiple device setting information associated with each word. The word-device setting information storage part 7 searches whether or not the word data output from the voice recognition part 2 is included in already stored word data. When the word data matches with already stored word data, the word-device setting information storage part 7 outputs multiple device setting information stored in association with the stored word data to the device control part 4.

The remote control signal receiving part 3 receives the remote control signal transmitted from the remote control signal transmission part 202 of the remote control device 200, and outputs the received remote control signal to the device control part 4. The communication control part 10 is connected with the communication control part 201 of the remote control device 200 and a communication control part (not shown) of the external device 300 through wires or by wireless, for making bidirectional communication with the remote control device 200 and the external device 300. The communication control part 10 receives device setting information indicating the current device setting states of the remote control device 200 and the external device 300 from the remote control device 200 and the external device 300 while transmitting device setting information for the external device 300 output from the external device control part 9 to the remote control device 200 and the external device 300.

The device control part 4 performs internal control of the device setting apparatus 100 in response to the remote control signal output from the remote control signal receiving part 3. The device control part 4 separates the device setting information output from the word-device setting information storage part 7 into internal device setting information and device setting information for the external device 300, for performing internal device setting of the device setting apparatus 100 in response to the internal device setting information and outputting the device setting information for the external device 300 to the external device control part 9.

The external device control part 9 receives the device setting information for the external device 300 from the device control part 4 and outputs the same to the communication control part 10. The external device control part 9 also receives the device setting information of the external device 300 input from the communication control part 10 and outputs this device setting information to the device control part 4.

The registration word list storage part 8, previously storing a registration word list including a plurality of words, outputs the registration word list to the display control part 5. The registration word list storage part 8 receives a newly registered word output from the word-device setting information storage part 7 and adds this word to the registration word list.

The display control part 5 receives device setting information for the display part 6 output from the device control part 4 and outputs a display control signal for controlling the display part 6 to the display part 6 in response to this device setting information. The display part 6, the display state of which is controlled by the display control signal, displays a prescribed display screen. The display control part 5 receives the registration word list from the registration word list storage part 8 and makes the display part 6 display the registration word list.

The communication control part 201 of the remote control device 200 receives device setting information for the remote control device 200 from the communication control part 10 of the device setting apparatus 100 and outputs the same to the remote control part 203 while transmitting the device setting information of the remote control device 200 output from the remote control part 203 to the communication control part 10. The remote control signal transmission part 202 transmits the remote control signal output from the remote control part 203 to the remote control signal receiving part 3 of the device setting apparatus 100.

The key part 205, formed by a plurality of keys including a registration start button, outputs an input signal corresponding to a key pressed by the operator to the remote control part 203. The remote control part 203 performs internal control of the remote control device 200 on the basis of the input device setting information for controlling the liquid crystal display part 204 while receiving the input signal input from the key part 205. The liquid crystal display part 204 displays a display screen responsive to the display control signal output from the remote control part 203.

In this embodiment, the device setting apparatus 100 corresponds to the device setting apparatus, the remote control device 200 and the external device 300 correspond to the set device, and the remote control device 200 corresponds to the remote control device.

The voice input part 1 corresponds to the voice input means, the voice recognition part 2 corresponds to the voice recognition means, the word-device setting information storage part 7 corresponds to the storage means, and the device control part 4 and the external device control part 9 correspond to the setting means. The device control part 4 corresponds to the internal device setting means, and the external device control part 9 corresponds to the external device setting means.

The remote control signal receiving part 3, the device control part 4, the display control part 5, the display part 6, the registration word list storage part 8, the external device control part 9 and the communication control part 10 correspond to the registration means, the device control part 4, the display control part 5, the display part 6 and the registration word list storage part 8 correspond to the display means, the device control part 4, the display control part 5 and the display part 6 correspond to the character display means, and the device control part 4, the external device control part 9 and the communication control part 10 correspond to the acquisition means. The remote control signal receiving part 3, the device control part 4, the display control part 5 and the display part 6 correspond to the selection means, and the remote control signal receiving part 3 corresponds to the receiving means.

Figure 2:
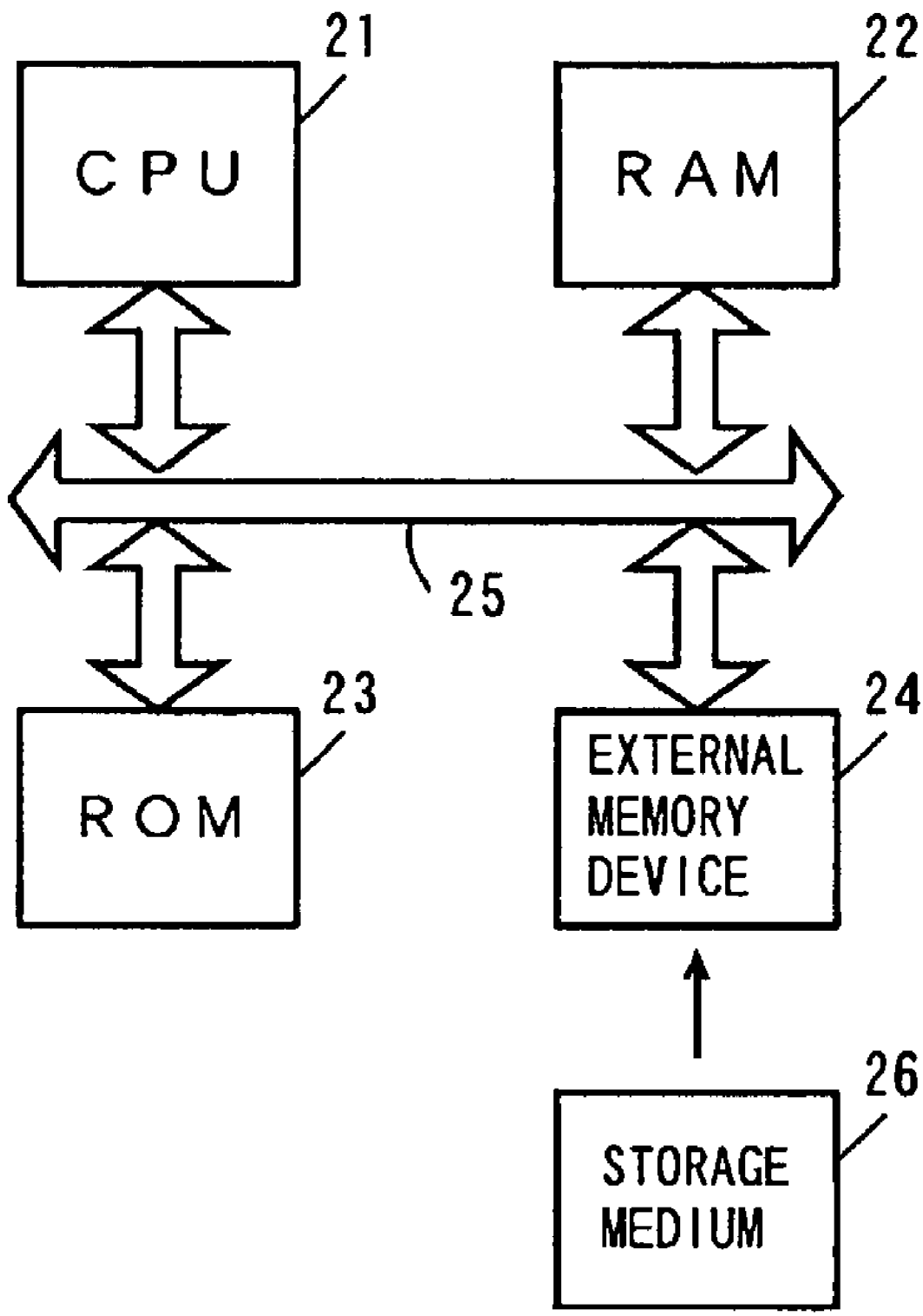
FIG. 2 is a block diagram showing a hardware structure for implementing functions of a voice recognition part, a device control part, a display control part and an external device control part shown in FIG. 1 by software.

The functions of the voice recognition part 2, the device control part 4, the display control part 5 and the external device control part 9 shown in FIG. 1 can also be implemented by software, and the hardware structure of this case is now described. FIG. 2 is a block diagram showing the hardware structure for implementing the functions of the voice recognition part 2, the device control part 4, the display control part 5 and the external device control part 9 shown in FIG. 1 by software.

Referring to FIG. 2, a CPU (central processing unit) 21, a RAM (random access memory) 22, a ROM (read only memory) 23 and an external memory device 24 are connected to a bus 25 respectively, for transmitting/receiving various control signals and data through the bus 25. The CPU 21 operates according to a device setting program stored in the ROM 23, for executing the functions of the voice recognition part 2, the device control part 4, the display control part 5 and the external device control part 9. The CPU 21 writes and reads data in and from the RAM 22 or the external memory device 24 at need, for implementing the functions of the word-device setting information storage part 7 and the registration word list storage part 8 as memory devices.

While the ROM 23 is employed as a recording medium recording the device setting program in the above description, a recording medium 26 used for the external memory device 24 may alternatively be employed. In this case, a floppy disk drive, a CD-ROM drive or an optical disk drive is employed as the external memory device 24, while a floppy disk, a CD-ROM or an optical disk is employed as the recording medium 26. Alternatively, a device setting program transmitted by a communication medium such as the Internet may be recorded in the external memory device 24 or the RAM 22 without employing the recording medium 26, for executing the recorded device setting program thereby implementing the aforementioned functions.

Figure 3:
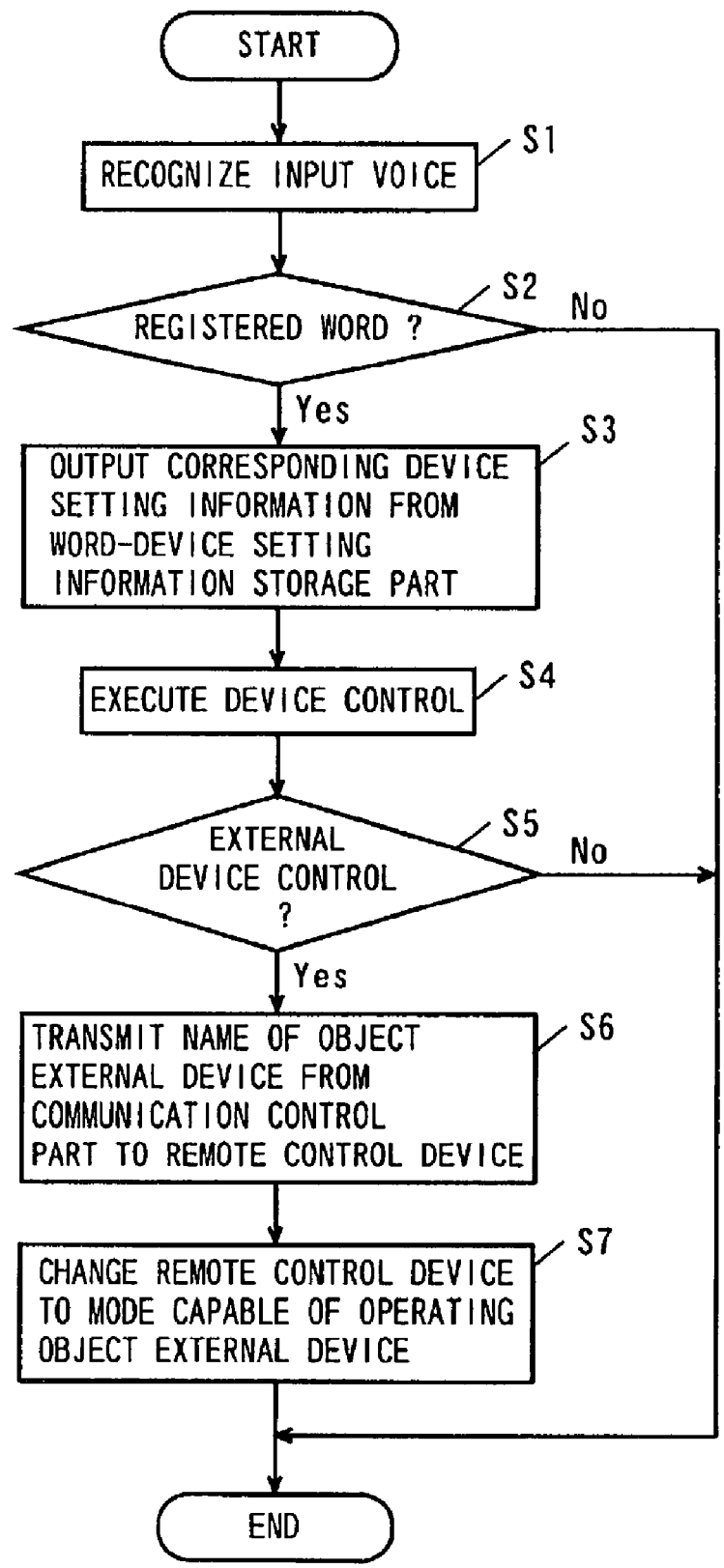
FIG. 3 is a flow chart showing device setting of the device setting apparatus show in FIG. 1.
Figure 4:
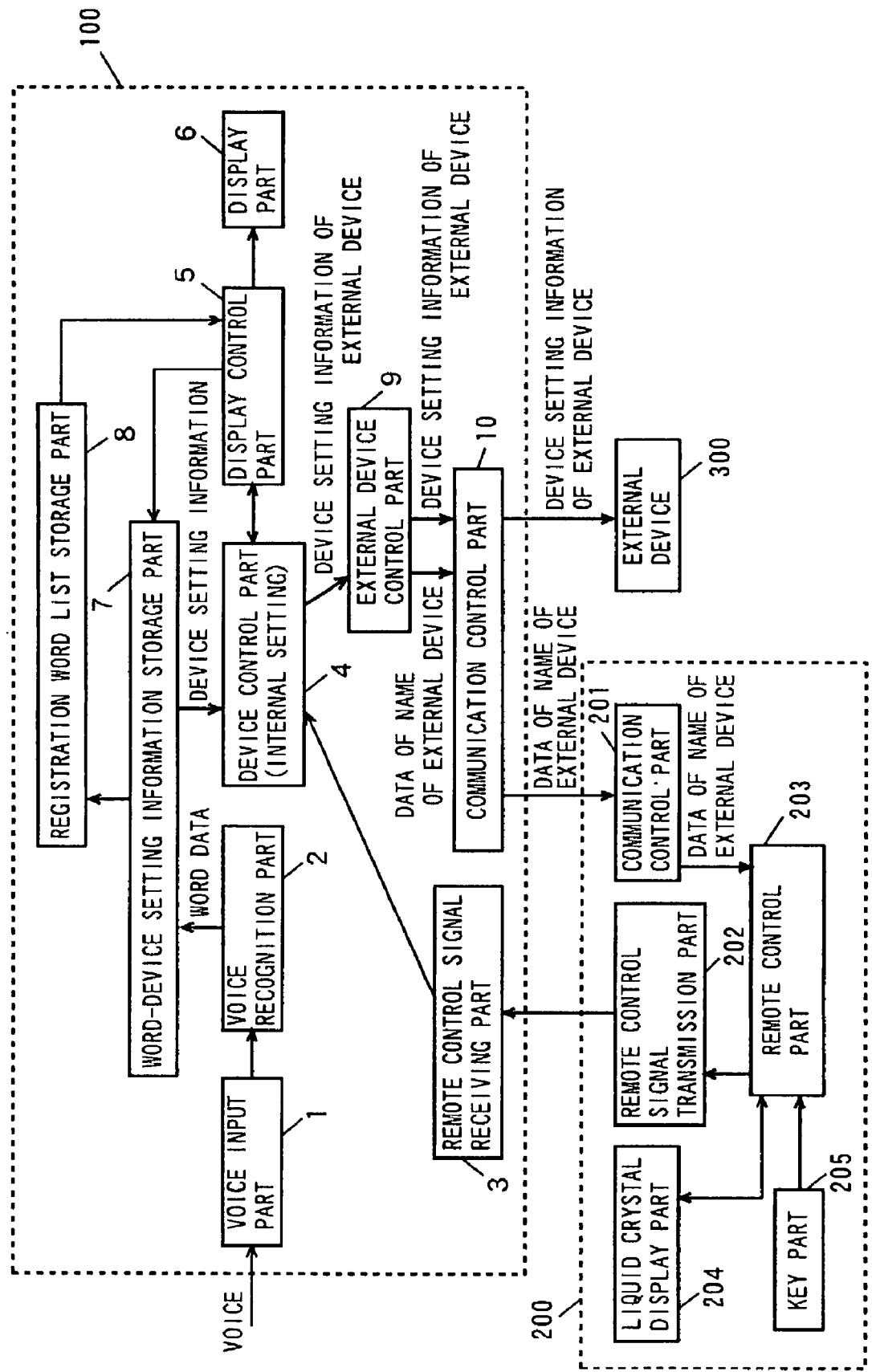
FIG. 4 is a block diagram for illustrating operations of the device setting system according to the flow chart shown in FIG. 3.

Device setting in the device setting apparatus having the aforementioned structure is now described. FIG. 3 is a flow chart showing the device setting in the device setting apparatus shown in FIG. 1, and FIG. 4 is a block diagram for illustrating operations of the device setting system according to the flow chart shown in FIG. 3.

When the operator inputs a single voice in the voice input part 1 by single vocalization, the voice input part 1 converts the input voice to a voice signal and outputs the same to the voice recognition part 2. The voice recognition part 2 recognizes the voice raised by the operator with the input voice signal, and outputs word data corresponding to the recognized voice to the word-device setting information storage part 7. Thus, the input voice is recognized at a step S1.

Then, the word-device setting information storage part 7 determines whether or not word data corresponding to the input word data is already registered. Thus, a determination is made at a step S2 as to whether or not the word corresponding to the input voice is already registered, for advancing to a step S3 if the word is registered, while ending the processing when the word is unregistered.

When determining the word as registered, the word-device setting information storage part 7 outputs multiple device setting information storage in association with the word data to the device control part 4. Thus, the word-device setting information storage part 7 outputs the multiple device setting information corresponding to the voice-recognized word at a step S3.

Then, the device control part 4 separates the input multiple device setting information into internal device setting information for the device setting apparatus 100 and device setting information for the external device 300. The device control part 4 sets the internal device state in response to the internal device setting information. When setting the display mode of the display part 6, for example, the device control part 4 operates the display control part 5 for setting the display part 6 to a display mode corresponding to the device setting information. Further, the device control part 4 outputs the device setting information for the external device 300 to the external device control part 9. The external device control part 9 transmits the device setting information for the external device 300 to the external device 300 through the communication control part 10. The external device 300 sets the internal device state in response to the received device setting information. Thus, the internal device and the external device 300 are set in response to the device setting information at a step S4.

Then, the external device control part 9 determines whether or not external device control is present by detecting input of the device setting information for the external device 300 from the device control part 4. Thus, the external control part 9 determines presence/absence of the external device control at a step S5 for advancing to a step S6 when the external device control is present while ending the processing when no external device control is present.

When determining that the external device control is present, the external device control part 9 outputs external device name data expressing the name of the external device 300 whose device setting information is transmitted on the basis of the input device setting information for the external device 300 to the communication control part 10 as device setting information for the remote control device 200. The communication control part 10 transmits the input external device name data to the communication control part 201 of the remote control device 200. Thus, the communication control part 10 transmits the name of the external device to be set to the remote control device 200 at a step S6.

Finally, the communication control part 201 outputs the input external device name data to the remote control part 203. The remote control part 203 changes the operation mode of the remote control device 200 to be capable operating the corresponding external device with the input external device name data, thereby adjusting the remote control device 200 to serve as a remote control device for the external device 300. At this time, the remote control part 203 outputs a display control signal to the liquid crystal display part 204, so that the liquid crystal display part 204 displays an operation screen for operating the external device 300. Thus, the remote control part 203 changes the remote control device 200 to the mode capable of operating the external device 300 to be subjected to device control at a step S7.

When the operator raises a single voice, the voice recognition part 2 recognizes this voice so that the device control part 4 and the external device control part 9 simultaneously execute corresponding multiple device setting with the corresponding multiple device setting information read from the word-device setting information storage part 7 through the aforementioned processing in this embodiment. Consequently, a desired device state can be set with single vocalization, for improving operability for device setting.

Figure 5:
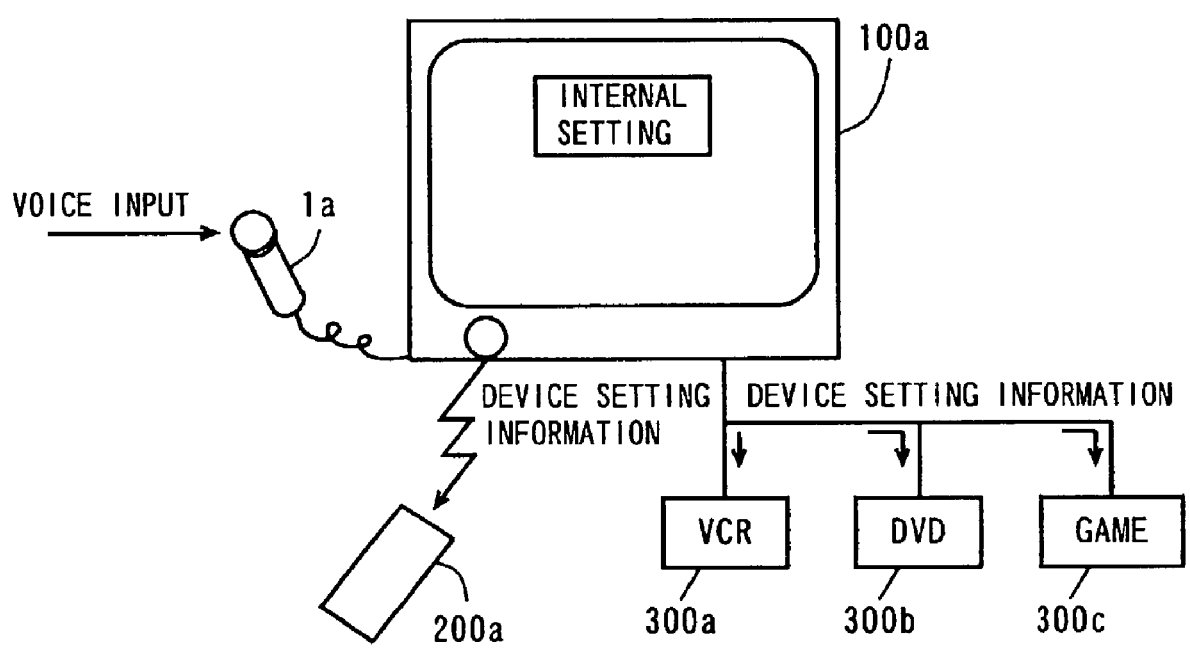
FIG. 5 is a schematic diagram showing an exemplary specific structure of the device setting system shown in FIG. 1.

The device setting of the device setting system shown in FIG. 1 is described in detail with a further specific example. FIG. 5 is a schematic diagram showing an exemplary specific structure of the device setting system shown in FIG. 1.

The device setting system shown in FIG. 5 is formed by a television receiver 100a serving as the device setting apparatus, a VCR (video cassette recorder) 300a, a DVD (digital video disk) drive 300b and a game machine 300c serving as external devices, and a remote control device 200a.

When the operator vocalizes "dee vee dee saisei" with a microphone 1a, for example, the voice recognition part 2 recognizes the words "ティーブイティーさいせい (replay DVD)" (step S1).

FIG. 6 illustrates exemplary words stored in the word-device setting information storage part 7 and device setting information corresponding to the words. As shown in FIG. 6, words "びでおさいせい (replay VCR)", for example, are associated with device setting information of input switching to "video 1", a graphic menu of "dynamic", a voice menu of "dynamic" and a screen mode of "normal" as the internal device state of the television receiver 100a as well as with device setting information for bringing the VCR 300a which is the external device into a "replay state", and the words and the device setting information are stored in the word-device setting information storage part 7 respectively.

Similarly, the contents of device control 1 to device control 4 (device states 1 to 4) are stored as internal device setting information of the television receiver 100a for "ティーブイティーさいせい (replay DVD)", "げーむ (game)", "てれびおん (TV on)", "てれびおやすみ (TV off)" and the like, while device control 5 (device state 5) is stored as device setting information for the VCR 300a, the DVD drive 300b and the game machine 300c.

When the word-device setting information storage part 7 stores the words and the corresponding device setting information shown in FIG. 6, the words "ティーブイティーさいせい い(replay DVD)" are registered (step S2) and hence the contents of the device control 1 to the device control 5 (device states 1 to 5) stored for these words are output to the device control part 4 as the device setting information (step S3).

Therefore, the device control part 4 and the like set the input switching to "video 2", the graphic menu and the voice menu to "cinema" and the screen mode to "self-wide" on the television receiver 100a, while the external device control part 9 and the like set the DVD drive 300 to a "replay" state (step S4).

In this case, the DVD drive 300b is subjected to device control and hence the external device control part 9 and the like transmit "DVD drive" to the remote control device 200a as external device name data, for changing the liquid display part 204 of the remote control device 200a to a screen for operating the DVD drive 300b. Therefore, the DVD drive 300b can be operated with the remote control device 200a.

Thus, the operator can simultaneously set the device states of the television receiver 100a, the VCR 300a, the DVD drive 300b and the game machine 300c by vocalizing any of the aforementioned words.

While device setting is performed with words already stored in the word-device setting information storage part 7 in the above description, this embodiment is formed to also perform word and set state registration registering a new word, i.e., a new voice used by the operator for device setting in association with new multiple device setting information, so that the operator can set device states similarly to the above by raising the newly registered voice.

Figure 7:
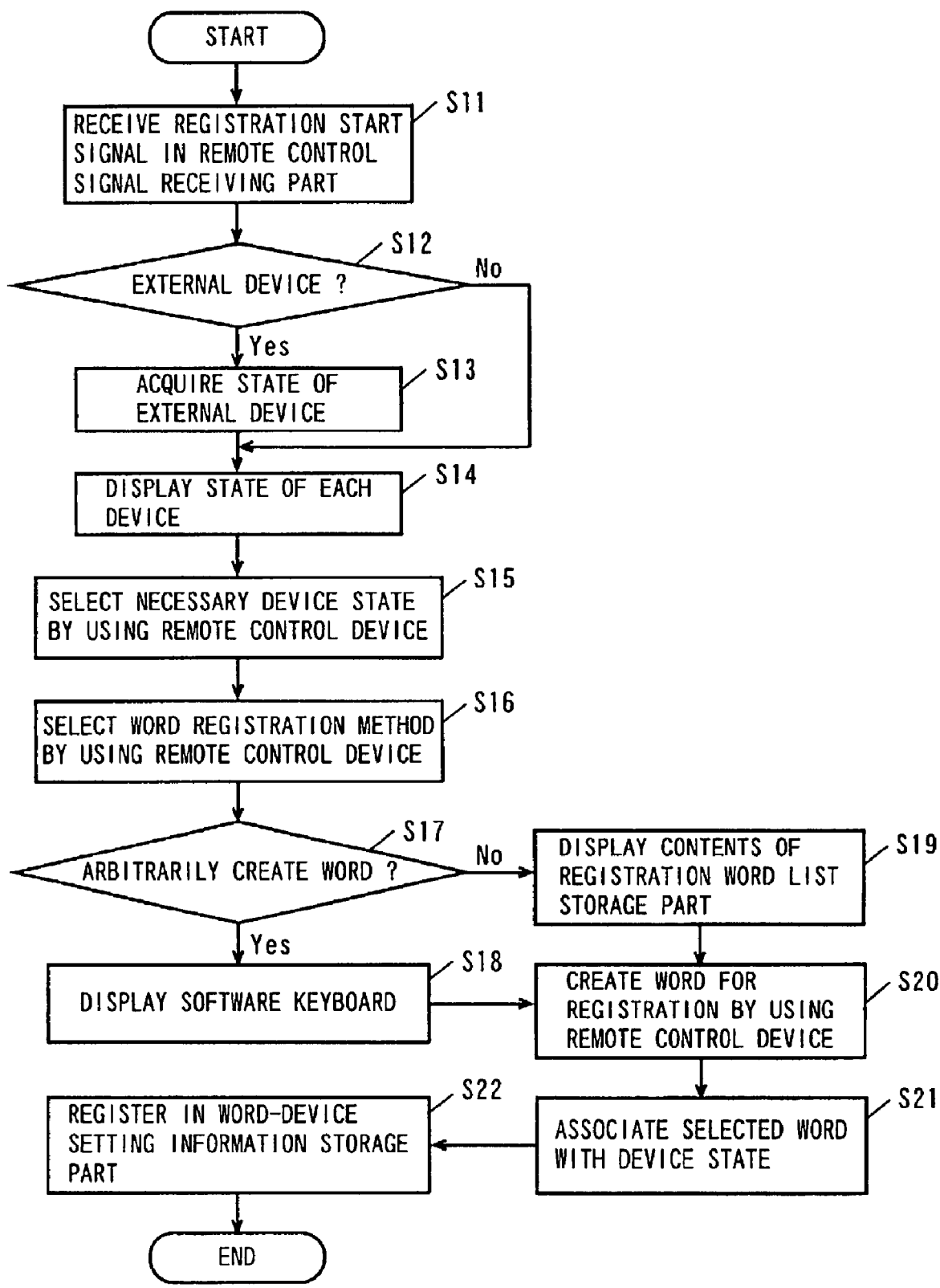
FIG. 7 is a flow chart showing word and set state registration of the device setting apparatus shown in FIG. 1.

The word and set state registration of the device setting apparatus shown in FIG. 1 is now described. FIG. 7 is a flow chart showing the word and set state registration of the device setting apparatus shown in FIG. 1, and FIG. 8 is a block diagram for illustrating operations of the device setting system according to the flow chart shown in FIG. 7.

When the operator presses the registration start button of the key part 205 of the remote control device 200, the key part 205 posts the remote control part 203 that the registration start button is pressed. The remote control part 203 responsively transmits a registration start signal to the remote control signal receiving part 3 through the remote control signal transmission part 202, and the remote control signal receiving part 3 outputs the received registration start signal to the device control part 4. Thus, the remote control signal receiving part 3 receives the registration start signal transmitted from the remote control device 200 at a step S11.

Then, the external device control part 9 detects whether or not the external device communicable through the communication control part 10 is connected and posts the result to the device control part 4, which in turn determines presence/absence of connection of the external device. Thus, the device control part 4, the external device control part 9 and the like determine presence/absence of connection of the external device at a step S12, so that the process advances to a step S13 when the external device is connected while advancing to a step S14 when no external device is connected.

When the external device is connected, the device control part 4 makes communication with the external device by the external device control part 9 through the communication control part 10, and acquires the state of device setting of the external device, i.e., device setting information. According to this embodiment, the external device 300 is connected and hence the external device 300 transmits the device setting information thereof to the communication control part 10, which in turn outputs the received device setting information to the device control part 4 through the external device control part 9. Thus, the state of the external device 300 is acquired at a step S13.

Then, the device control part 4 acquires the current device setting state of the device setting apparatus 100, i.e., device setting information, and outputs the same to the display control part 5. When acquiring the state of the external device 300 at the step S13, the device control part 4 outputs the input device setting information to the display control part 5 as the current device setting state of the external device 300. Consequently, the display control part 5 outputs the device setting information of the device setting apparatus 100 and that of the external device 300, so that the display part 6 displays a list of the device setting information of the device setting apparatus 100 and that of the external device 300. Thus, the respective device states are displayed at a step S14.

Then, the operator operates the key part 205 of the remote control device 200 for selecting device setting information to be registered from the device setting information displayed on the display part 6, so that an operation signal responsive to the operation of the key part 5 is output to the remote control part 203, which in turn transmits the operation signal to the remote control signal receiving part 3 through the remote control signal transmission part 202. The remote control signal receiving part 3 outputs the received operation signal to the display control part 5 through the device control part 4, and the display control part 5 outputs the device setting information selected with the operation signal to the device control part 4. Thus, the necessary device state is selected by operating the remote control device 200 at a step S15.

Then, the device control part 4 controls the display control part 5 to display a selection screen for a word registration method on the display part 6. As the word registration method, the operator may combine desired words selected from a plurality of previously prepared words and register the combined words, or may register arbitrary words. When the operator operates the key part 205 of the remote control device 200 and selects the used word registration method from those displayed on the display part 6, an operation signal responsive to the operation of the key part 205 is output to the remote control part 203, which in turn transmits the operation signal to the remote control signal receiving part 3 through the remote control signal transmission part 202. The remote control signal receiving part 3 outputs the received operation signal to the display control part 5 through the device control part 4, and the display control part 5 outputs the registration method selected with the operation signal to the device control part 4. Thus, the word registration method is selected by operating the remote control device 200 at a step S16.

Then, the device control part 4 determines whether or not the method of registering arbitrary words is selected as the word registration method. Thus, a determination is made as to whether or not arbitrary words are created at a step S17, and the process advances to a step S18 when creating arbitrary words while advancing to a step S19 when not creating arbitrary words but combining desired words selected from the previously prepared plurality of words.

When creating arbitrary words, the device control part 4 controls the display control part 5 to display a software keyboard shown in FIG. 9 on the display part 6. Thus, the display part 6 displays the software keyboard at the step S18.

When not arbitrarily creating words, the display control part 5 reads the previously stored registration word list from the registration word list storage part 8, and makes the display part 6 display the registration word list listing a plurality of words. Thus, the contents of the registration word list storage part 8 are displayed at the step S19.

Then, the operator operates the key part 205 of the remote control device 200 and selects desired characters or words from the aforementioned software keyboard or the registration word list, so that an operation signal responsive to the operation of the key part 205 is output to the remote control part 203, which in turn transmits the operation signal to the remote control signal receiving part 3 through the remote control signal transmission part 203. The remote control signal receiving part 3 outputs the received operation signal to the display control part 5 through the device control part 4, and the display control part 5 outputs the characters or words selected with the operation signal to the device control part 4. The device control part 4 creates word data formed by the input characters or words. Thus, the words for registration are created by operating the remote control device at a step S20.

Then, the device control part 4 associates the input word data with the device setting information selected at the step S15. Thus, the selected words are associated with the device state at a step S21.

Then, the device control part 4 registers the associated word data and device setting information in the word-device setting information storage part 7. Thus, the selected words and device setting information are registered in the word-device setting information storage part 7 at a step 22. The word-device setting information storage part 7 outputs word data newly registered through the software keyboard to the registration word list storage part 8 so that a new word is added to the registration word list and can also be used when thereafter creating words with the registration word list.

When the operator operates the remote control device 200, the display part 6 displays acquired multiple device setting information and a plurality of words or characters respectively so that a desired word and a desired device state can be newly registered in the word-device setting information storage part 7 by selecting the same through the aforementioned processing in this embodiment. Therefore, the operator can register a word easy to use for him along with desired device setting information through a simple operation, and the operability can be further improved.

Figures 10, 11:
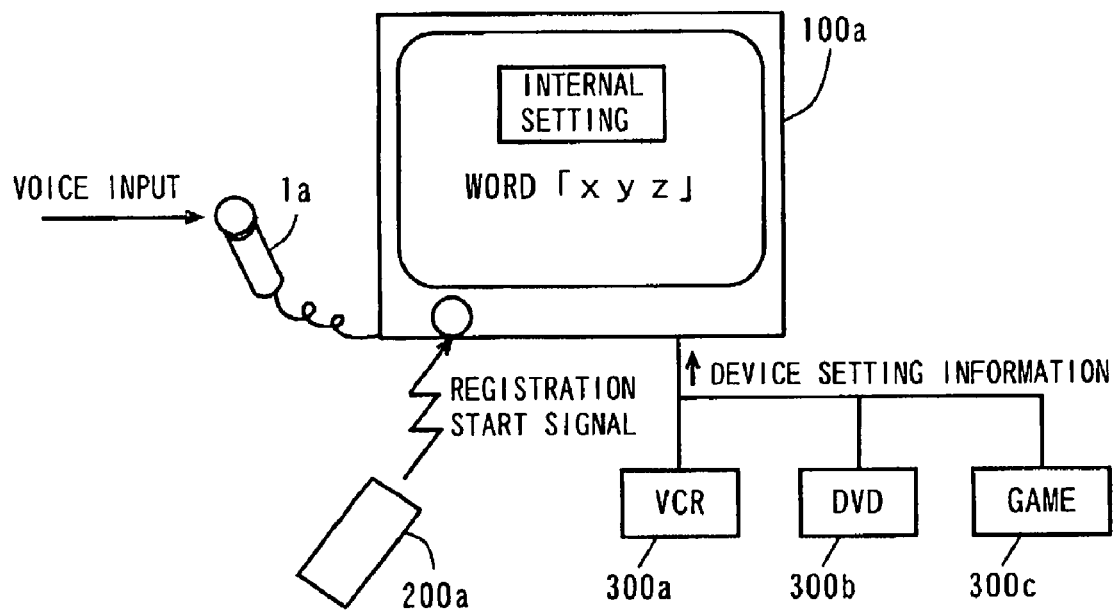
FIG. 10 is a schematic diagram for specifically illustrating the word and set state registration shown in FIG. 7 with the device setting apparatus shown in FIG. 5.
FIG. 11 illustrates an exemplary device state list employed for the word and set state registration shown in FIG. 7.

The word and set state registration of the device setting system shown in FIG. 1 is described in more detail with a further specific example. FIG. 10 is a schematic diagram for specifically illustrating the aforementioned word and set state registration with the device setting system show in FIG. 5.

It is assumed that the operator presses the registration start button of the remote control device 200a while replaying the VCR 300a. At this time, the remote control signal receiving part 3 of the television receiver 100a receives a registration start signal (step S11). The VCR 300a, the DVD drive 300b and the game machine 300c are connected as the external devices (step 12), and hence the external device control part 9 and the like acquire the device setting information of the VCR 300a, the DVD drive 300b and the game machine 300c (step S13), and the display part 6 displays a current device state list shown in FIG. 11, for example (step S14).

Then, the operator selects items to be active with the remote control device 200a. When the operator selects "channel (input)", "graphic menu", "voice menu", "screen mode" and "external device (VCR)", for example, multiple device setting information for setting the channel (input) to "video 1", the graphic menu to "dynamic", the voice menu to "dynamic", the screen mode to "normal" and the external device (VCR) to a "replay" state is selected (step S15).

When the operator selects the word registration method of combining words selected from previously prepared ones with the remote control device 200a (step S16), the display part 6 displays a word list shown in FIG. 12, for example, as the contents of the registration word list storage part 8 (step S19). When the operator operates the remote control device 200a and selects "ビデオ(VCR) (びでお(bideo))" and "再生(replay) (さいせい (saisei))" for creating words "ビデオ再生(replay VCR) (びでおさいせい(bideo saisei))" (step S20), for example, the created words are associated with the state of the selected device (step S21), so that the word-device setting information storage part 7 registers the words "ビデオ再生 (replay VCR) (びでおさいせい(bideo saisei))" and the multiple device setting information for setting the channel (input) to "video 1", the graphic menu to "dynamic", the voice menu to "dynamic", the screen mode to "normal" and the external device (VCR) to the "replay" state (step S22).

When the operator selects the method capable of arbitrary selecting words, the display part 6 displays the software keyboard shown in FIG. 9 (step S19). When the operator operates the remote control device 200a and selects "び(bi)", "で(de)", "お(o)", "さ(sa)", "い(i)", "せ(se)" and "い(i)" for creating words "びでおさいせい(replay VCR)" (step 20), the created words are associated with the aforementioned selected device state (step S21) and registered in the word-device setting information storage part 7 (step S22).

While word data corresponding to voices are registered for voice recognition in this embodiment, the voice of the operator may alternatively be registered in the state of a voice signal for performing voice recognition by determining whether or not the voice raised by the operator matches with the voice pattern. In this case, a person other than the operator, i.e., the registrant, cannot operate the system and hence this is effective for limiting the operator.

While displayed words or characters are subjected to selection for creating and registering word data corresponding to a new voice when registering the new voice, the voice of the operator input from the voice input part may alternatively be registered as the new voice, while the displayed words may not be combined but may be directly registered with desired device setting information. In this case, the new voice can be more readily registered and the operability can be further improved.

The invention claimed is:

1. A device setting apparatus comprising:
   a voice input unit that converts an input voice to a voice signal;
   a voice recognition unit that recognizes a voice corresponding to said voice signal converted by said voice input unit;
   a storage that stores multiple device setting information associated with a single voice;
   a setting unit that reads multiple device setting information corresponding to said voice recognized by said voice recognition unit from said storage and performing multiple device setting for setting an internal or external device state in response to said read multiple device setting information;
   a registration unit that registers multiple device setting information associated with a new voice in said storage;
   a display that displays a plurality of words corresponding to a registrable voice; and
   a selector that selects a word corresponding to a voice to be registered from said plurality of words displayed on said display, wherein
   said registration unit registers said word selected by said selector in said storage in association with multiple device setting information.

2. The device setting apparatus according to claim 1, wherein
   said setting unit includes an internal device setting unit that performs multiple device setting in said device setting apparatus.

3. The device setting apparatus according to claim 1, wherein
said device setting apparatus is connected with an external device in a bidirectionally communicable state, and
said setting unit includes an external device setting unit that performs multiple device setting on said external device.

4. The device setting apparatus according to claim 1, wherein
said selector further includes a receiver that receives a remote control signal transmitted to said device setting apparatus, and
said selector performs selection in response to said remote control signal received by said receiver.

5. A device setting apparatus comprising:
a voice input unit that converts an input voice to a voice signal;
a voice recognition unit that recognizes a voice corresponding to said voice signal converted by said voice input unit;
a storage that stores multiple device setting information associated with a single voice;
a setting unit that reads multiple device setting information corresponding to said voice recognized by said voice recognition unit from said storage and performing multiple device setting for setting an internal or external device state in response to said read multiple device setting information;
a registration unit that registers multiple device setting information associated with a new voice in said storage;
a character display that displays a plurality of characters for forming a plurality of words corresponding to a registrable voice; and
a selector that selects a character forming a word corresponding to a voice to be registered from said plurality of characters displayed on said character display, wherein
said registration unit registers said word formed by said character selected by said selector in said storage in association with multiple device setting information.

6. The device setting apparatus according to claim 5, wherein
said selector further includes a receiver that receives a remote control signal transmitted to said device setting apparatus, and
said selector performs selection in response to said remote control signal received by said receiver.

7. A device setting apparatus comprising:
a voice input unit that converts an input voice to a voice signal;
a voice recognition unit that recognizes a voice corresponding to said voice signal converted by said voice input unit;
a storage that stores multiple device setting information associated with a single voice;
a setting unit that reads multiple device setting information corresponding to said voice recognized by said voice recognition unit from said storage and performing multiple device setting for setting an internal or external device state in response to said read multiple device setting information;
a registration unit that registers multiple device setting information associated with a new voice in said storage;
an acquisition unit that acquires multiple device setting information; and a selector that selects multiple device setting information associated with a new voice from said multiple device setting information acquired by said acquisition unit, wherein
said registration unit registers said multiple device setting information selected by said is selector in said storage in association with said new voice.

8. The device setting apparatus according to claim 7, wherein
said selector further includes a receiver that receives a remote control signal transmitted to said device setting apparatus, and
said selector performs selection in response to said remote control signal received by said receiver.

9. A device setting system comprising:
a device setting apparatus; and
a set device connected with said device setting apparatus in a bidirectionally communicable state, wherein
said device setting apparatus includes:
a voice input unit that converts an input voice to a voice signal;
a voice recognition unit that recognizes a voice corresponding to said voice signal converted by said voice input unit;
a storage that stores multiple device setting information associated with a single voice;
a setting unit that reads multiple device setting information corresponding to said voice recognized by said voice recognition unit from said storage and performing multiple device setting for setting an internal device state of said set device in response to said read multiple device setting information;
a registration unit that registers multiple device setting information associated with a new voice in said storage;
a display that displays a plurality of words corresponding to a registrable voice; and
a selector that selects a word corresponding to a voice to be registered from said plurality of words displayed on said display, wherein
said registration unit registers said word selected by said selector in said storage in association with multiple device setting information.

10. The device setting system according to claim 9, wherein
said set device includes a remote control device for remote-controlling said device setting apparatus, connected with said device setting apparatus in a bidirectionally communicable state.

11. A recording medium recording a device setting program for making a processing unit perform device setting in a device setting apparatus having said processing unit, a voice input unit that converts an input voice to a voice signal and a storage that stores multiple device setting information associated with a single voice, wherein
said device setting program causes said processing unit perform steps of:
recognizing a voice corresponding to said voice signal converted by said voice input unit,
reading multiple device setting information corresponding to recognized said voice from said storage and performing multiple device setting for setting an internal or external device state in response to read said multiple device setting information, and
displaying a plurality of words corresponding to a registrable voice and registering a word selected from displayed said plurality of words in said storage as a new voice in association with multiple device setting information.

12. The recording medium recording a device setting program according to claim 11, wherein
said setting step includes a step of performing multiple device setting in said device setting apparatus.

13. The recording medium recording a device setting program according to claim 11, wherein
said setting step includes a step of performing multiple device setting on an external device connected with said device setting apparatus in a bidirectionally communicable state.

14. A recording medium recording a device setting program
for making a processing unit perform device setting in a device setting apparatus having said processing unit, a voice input unit that converts an input voice to a voice signal and a storage that stores multiple device setting information associated with a single voice, wherein
said device setting program causes said processing unit perform steps of:
recognizing a voice corresponding to said voice signal converted by said voice input unit, reading multiple device setting information corresponding to recognized said voice from said storage and performing multiple device setting for setting an internal or external device state in response to read said multiple device setting information, and
acquiring multiple device setting information and registering multiple device setting information selected from said acquired multiple device setting information in said storage in association with said new voice.

15. A recording medium recording a device setting program for making a processing unit perform device setting in a device setting apparatus having said processing unit, a voice input unit that converts an input voice to a voice signal and a storage that stores multiple device setting information associated with a single voice, wherein
said device setting program causes said processing unit perform steps of:
recognizing a voice corresponding to said voice signal converted by said voice input unit,
reading multiple device setting information corresponding to recognized said voice from said storage and performing multiple device setting for setting an internal or external device state in response to read said multiple device setting information, and
displaying a plurality of characters for forming a plurality of words corresponding to a registrable voice and registering a word formed by a character selected from displayed said plurality of characters in said storage as a new voice in association with multiple device setting information.

16. The recording medium recording a device setting program according to claim 15, wherein
said registering step includes steps of acquiring multiple device setting information and registering multiple device setting information selected from acquired said multiple device setting information in said storage in association with said new voice.

17. A device setting apparatus comprising:
voice input means for converting an input voice to a voice signal;
voice recognition means for recognizing a voice corresponding to said voice signal converted by said voice input means;
storage means for storing multiple device setting information associated with a single voice;
setting means for reading multiple device setting information corresponding to said voice recognized by said voice recognition means from said storage means and performing multiple device setting for setting an internal or external device state in response to said read multiple device setting information;
registration means for registering multiple device setting information associated with a new voice in said storage means,
display means for displaying a plurality of words corresponding to a registrable voice; and
selection means for selecting a word corresponding to a voice to be registered from said plurality of words displayed on said display means, wherein
said registration means registers said word selected by said selection means in said storage means in association with multiple device setting information.

18. A device setting system comprising:
a device setting apparatus; and
a set device connected with said device setting apparatus in a bidirectionally communicable state, wherein
said device setting apparatus includes:
voice input means for converting an input voice to a voice signal;
voice recognition means for recognizing a voice corresponding to said voice signal converted by said voice input means;
storage means for storing multiple device setting information associated with a single voice;
setting means for reading multiple device setting information corresponding to said voice recognized by said voice recognition means from said storage means and performing multiple device setting for setting an internal device state of said set device in response to said read multiple device setting information;
registration means for registering multiple device setting information associated with a new voice in said storage means;
display means for displaying a plurality of words corresponding to a registrable voice; and
selection means for selecting a word corresponding to a voice to be registered from said plurality of words displayed on said display means, and wherein
said registration means registers said word selected by said selection means in said storage means in association with multiple device setting information.

19. A recording medium recording a device setting program for making a processing unit perform device setting in a device setting apparatus having said processing unit, voice input means for converting an input voice to a voice signal and storage means for storing multiple device setting information associated with a single voice, wherein
said device setting program causes said processing unit perform steps of:
recognizing a voice corresponding to said voice signal converted by said voice input means,
reading multiple device setting information corresponding to recognized said voice from said storage means and performing multiple device setting for setting an internal or external device state in response to read said multiple device setting information, and
displaying a plurality of words corresponding to a registrable voice and registering a word selected from displayed said plurality of words in said storage means as a new voice in association with multiple device setting information.

* * * * *